United States Patent
Wige et al.

(10) Patent No.: US 9,837,100 B2
(45) Date of Patent: Dec. 5, 2017

(54) AMBIENT SOUND RENDERING FOR ONLINE MEETINGS

(71) Applicant: GetGo, Inc., Boston, MA (US)

(72) Inventors: Eugen Wige, Dresden (DE); Klaus Reindl, Dresden (DE)

(73) Assignee: GetGo, Inc., Boston, MA (US)

( * ) Notice: Subject to any disclaimer, the term of this patent is extended or adjusted under 35 U.S.C. 154(b) by 204 days.

(21) Appl. No.: 14/704,450

(22) Filed: May 5, 2015

(65) Prior Publication Data

US 2016/0329063 A1 Nov. 10, 2016

(51) Int. Cl.
| | |
|---|---|
| *G10L 21/00* | (2013.01) |
| *G10L 21/034* | (2013.01) |
| *H04M 3/56* | (2006.01) |
| *G06F 3/16* | (2006.01) |
| *G10L 21/0208* | (2013.01) |
| *H04S 1/00* | (2006.01) |

(52) U.S. Cl.
CPC .......... *G10L 21/034* (2013.01); *G06F 3/162* (2013.01); *G06F 3/165* (2013.01); *G10L 21/0208* (2013.01); *H04M 3/568* (2013.01); *H04S 1/002* (2013.01); *G10L 2021/02087* (2013.01); *H04M 2203/352* (2013.01); *H04M 2203/5072* (2013.01); *H04S 2400/09* (2013.01); *H04S 2400/13* (2013.01)

(58) Field of Classification Search
None
See application file for complete search history.

(56) References Cited

U.S. PATENT DOCUMENTS

| | | | |
|---|---|---|---|
| 2,457,712 A | 12/1948 | Olson et al. | |
| 7,117,145 B1 * | 10/2006 | Venkatesh | G10L 21/0208 704/200 |
| 7,224,385 B2 | 5/2007 | Shinada | |
| 8,958,582 B2 | 2/2015 | Yoo et al. | |
| 9,329,833 B2 * | 5/2016 | Swierk | G06F 3/167 |

(Continued)

OTHER PUBLICATIONS

International Search Report for PCT/US2016/030916, mailed from the European Patent Office on Jul. 26, 2016.

*Primary Examiner* — Kevin Ky
(74) *Attorney, Agent, or Firm* — BainwoodHuang

(57) ABSTRACT

Techniques of conducting an online meeting involve outputting ambient sound to a participant of an online meeting. Along these lines, in an online meeting during which a participant wears headphones, the participant's computer receives microphone input that contains both speech from the participant and ambient sound that the participant may wish to hear. In response to receiving the microphone input, the participant's computer separates low-volume sounds from high-volume sounds. However, instead of suppressing this low-volume sound from the microphone input, the participant's computer renders this low-volume sound. In most cases, this low-volume sound represents ambient sound generated in the vicinity of the meeting participant. The participant's computer then mixes the low-volume sound with speech received from other conference participants to form output in such a way that the participant may distinguish this sound from the received speech. The participant's computer then provides the output to the participant's headphones.

12 Claims, 4 Drawing Sheets

(56) References Cited

U.S. PATENT DOCUMENTS

| | | | |
|---|---|---|---|
| 2009/0154739 A1* | 6/2009 | Zellner | H04R 1/1041 381/311 |
| 2010/0020954 A1* | 1/2010 | Gilg | H04M 3/56 379/202.01 |
| 2011/0289410 A1* | 11/2011 | Paczkowski | G10L 21/06 715/716 |
| 2011/0307260 A1* | 12/2011 | Zhang | G06F 3/017 704/275 |
| 2012/0116755 A1* | 5/2012 | Park | G10L 21/02 704/205 |
| 2013/0006622 A1* | 1/2013 | Khalil | G10L 19/012 704/233 |
| 2013/0045724 A1 | 2/2013 | Na | |
| 2014/0010378 A1* | 1/2014 | Voix | H04R 1/1083 381/57 |
| 2014/0079248 A1* | 3/2014 | Short | G10L 21/0272 381/119 |
| 2014/0122068 A1 | 5/2014 | Hirohata et al. | |
| 2014/0247319 A1 | 9/2014 | Anderson et al. | |
| 2014/0288927 A1* | 9/2014 | Klug | G10L 21/0208 704/228 |
| 2015/0280669 A1* | 10/2015 | Vilermo | H04R 1/1041 381/107 |
| 2015/0317123 A1* | 11/2015 | Wu | H04L 65/1089 715/727 |
| 2015/0325251 A1* | 11/2015 | Dusan | G10L 21/0208 704/226 |
| 2015/0371643 A1* | 12/2015 | Ramo | G10L 19/008 381/1 |

\* cited by examiner

AMBIENT SOUND RENDERING FOR ONLINE MEETINGS

BACKGROUND

A web conference typically shares voice data among multiple users. To create a web conference, the users connect their client devices to a conference server (e.g., through the Internet). The conference server typically combines voice data from all of the users into a combined audio feed and shares this combined audio feed with all of the users. Accordingly, users are able to form a collaborative exchange even though the users may be scattered among remote locations.

In conventional approaches to conducting a web conference, a user's computer filters out low amplitude, or low volume, sound, which is throughout this document any component different from the actual user's voice. The result of such filtering is that other users at the web conference do not hear background sound in the vicinity of the user. For example, the user may be conducting the web conference from a location within earshot of traffic noise. As the traffic noise has low volume relative to the user's voice, the user's computer effectively suppresses the traffic noise by removing low-amplitude sound.

SUMMARY

Unfortunately, there are deficiencies in the above-described conventional approaches. For example, a user may want to hear background sounds such as a nearby colleague's voice—which would be a low-volume sound—but cannot because the user's computer filters out such low-volume sounds. When the speakers are headphones, the user cannot hear such sounds unless the user removes the headphones and interrupts the web conference.

In contrast with the above-described conventional approaches that may cause a participant to interrupt an online meeting in order to hear ambient sound, improved techniques of conducting an online meeting involve outputting ambient sound to a participant of an online meeting. Along these lines, in an online meeting during which a participant wears headphones, the participant's computer receives microphone input that contains both speech from the participant and ambient sound that the participant may wish to hear. In response to receiving the microphone input, the participant's computer separates low-volume sounds from high-volume sounds. However, instead of suppressing this low-volume sound from the microphone input, the participant's computer renders this low-volume sound. In most cases, this low-volume sound represents ambient sound generated in the vicinity of the meeting participant. The participant's computer then mixes the low-volume sound or its processed/enhanced version with speech received from other conference participants to form an output in such a way that the participant may distinguish this sound from the received speech. The participant's computer then provides the output to the participant's headphones.

Advantageously, the improved techniques enable an online meeting participant to react to ambient sounds—when encapsulated in low-volume sounds that are filtered out by the computer—without interrupting the meeting. Further, when the rendering of the low-volume sound takes localization information into account, the online meeting participant may be able to determine the approximate location of a source of the ambient sound. For example, when a colleague says something to the participant during an online meeting, the participant may know in which direction to look in response.

One embodiment of the improved techniques is directed to a method of conducting an online meeting. The method includes receiving microphone input from a microphone of a participant of the online meeting. The method also includes obtaining online meeting input from an online meeting device remote from the online meeting participant. The method further includes providing, to a speaker of the participant of the online meeting, a speaker output containing (i) at least a portion of the microphone input and (ii) the online meeting input.

Additionally, some embodiments are directed to an electronic apparatus constructed and arranged to conduct an online meeting. The apparatus includes a network interface, memory and controlling circuitry coupled to the memory. The controlling circuitry is constructed and arranged to carry out a method of conducting an online meeting.

Further, some embodiments are directed to a computer program product having a non-transitory, computer-readable storage medium which stores executable code, which when executed by a controlling circuitry, causes the controlling circuitry to carry out a method of conducting an online meeting.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of conducting an online meeting involve outputting ambient sound to a participant of an online meeting. Advantageously, the improved techniques enable an online meeting participant to react to ambient sounds—when encapsulated in low-volume sounds that are filtered out by the computer—without interrupting the meeting.

Figure 1:
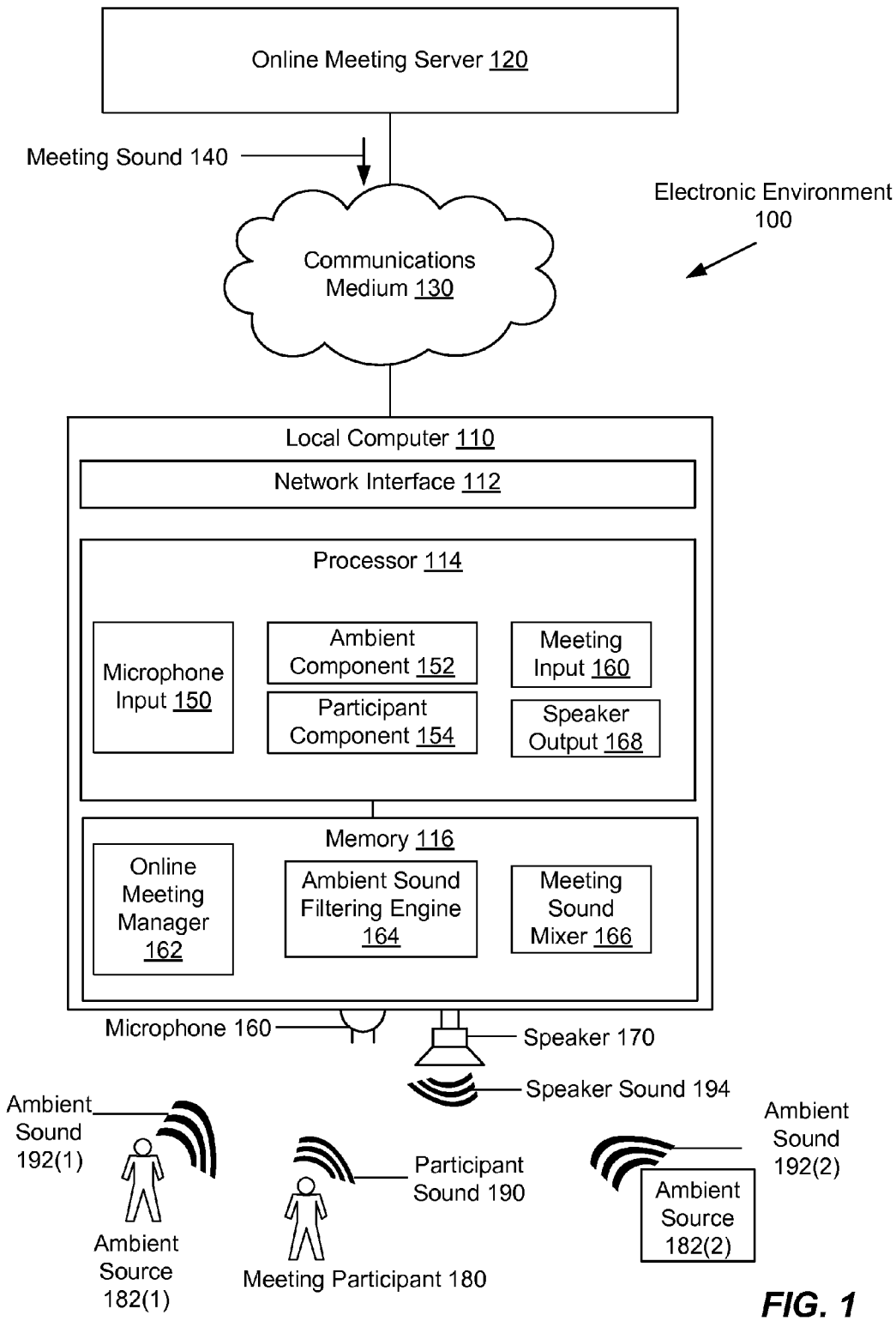
FIG. 1 is a block diagram illustrating an example electronic environment in which the improved technique can be carried out.

FIG. 1 shows an example electronic environment 100 in which embodiments of the improved techniques hereof can be practiced. The electronic environment 100 includes a local computer 110, an online meeting server 120, and a communications medium 130.

The local computer 110 is configured to provide a meeting participant 180 with audio from an online meeting and provide other meeting participants with audio from the participant. In addition, the local computer 110 is configured to provide the meeting participant 180 with low-volume sounds that may represent ambient sound generated in the vicinity of the meeting participant 180. The local computer 110 includes a network interface 112, a processor 114, and memory 116. Attached to the local computer 110, either with wires or wirelessly, are a microphone 160 and a speaker 170.

The network interface 112 includes, for example, adapters, such as SCSI target adapters and network interface adapters, for converting electronic and/or optical signals received from the communications medium 130 to electronic form for use by local computer 110. The processor 114 includes one or more processing chips and/or assemblies. In a particular example, the processor 114 includes a multi-core CPU. The memory 116 includes both volatile memory (e.g., RAM), and non-volatile memory, such as one or more ROMs, disk drives, solid state drives, and the like. The processor 114 and the memory 116 together form control circuitry, which is constructed and arranged to carry out various functions as described herein.

The memory 116 also includes a variety of software constructs realized in the form of executable instructions, such as online meeting manager 162, ambient sound filtering engine 164, and meeting sound mixer 166. When the executable instructions are run by the processor 114, the processor 114 is caused to carry out the operations of the software constructs. Although certain software constructs are specifically shown and described, it is understood that the memory 116 typically includes many other software constructs which are not shown, such as an operating system, various applications, processes, and daemons, for example.

The online meeting server 120 is configured to provide participants of the online meeting with audio from other participants. To accomplish this, the online meeting server 120 performs a mixing of audio from each participant's computer in such a way that each participant receives audio from other participants but not from him/herself.

As illustrated in FIG. 1, the microphone 160 is connected to the computer 110. However, any configuration of microphones is possible. For example, the microphone 160 may be attached to the headphones 170. Further, there may be multiple microphones placed in the vicinity of the computer 110. Moreover, some microphones may be highly directional in nature and will thus provide localization information.

The speaker 170, as illustrated in FIG. 1, is attached to the computer 110. However, in most cases in which ambient sound is to be provided to the speaker 170, the speaker 170 takes the form of headphones. It will be assumed throughout the rest of this discussion that the speaker 170 takes the form of headphones worn by the meeting participant 180.

Communications medium 130 provides network connections between the local computer 110 and online meeting server 120. Communications medium 130 may implement any of a variety of protocols and topologies that are in common use for communications over the Internet. Furthermore, communications medium 130 may include various components (e.g., cables, switches/routers, gateways/bridges, etc.) that are used in such communications.

During an example operation, the meeting participant 180 logs into an online meeting by inputting a command into the local computer 110. In response to the command, the processor 114 forms a connection to the online meeting server 120 via the network interface 116.

After the meeting participant 180 has logged into the online meeting, the online meeting manager 162 causes the processor 114 to display a GUI window containing meeting data such as a list of meeting participants and configuration settings for the online meeting. An example configuration setting is a mute setting that determines whether or not the voice of the meeting participant 180 may be transmitted to the other meeting participants. Another example configuration setting takes the form of an ambient sound setting that determines whether or not ambient sound is to be provided to the headphones 170.

After the meeting participant 180 successfully logs into the online meeting, the processor 114 receives microphone input 150 from a microphone 160. The microphone input 150 contains sounds such as the meeting participant's voice 190 and ambient sounds 192(1) (e.g., voice of a colleague 182(1)) and 192(2) (e.g., an external telephone 182(2)). In some arrangements, the microphone input 150 takes the form of an electrical signal that carries the participant's voice 190 and ambient sounds 192(1) and 192(2). It should be understood that, while FIG. 1 illustrates only two ambient sound sources 182(1) and 182(2), any number of ambient sources may be considered in the improved techniques described herein.

As the processor 114 receives the microphone input 150, the ambient sound filtering engine 164 causes the processor 114 to render sounds contained in the microphone input 150. Generally, filtering these sounds means preparing the sounds to be provided back to the headphones 170.

However, in most cases, in filtering the sounds, the processor separates low-volume sounds (mostly the ambient sounds 192(1) and 192(2) in most cases) from high-volume sounds (mostly the participant's voice 190 in most cases). A result of the filtering is to resolve the microphone input 150 into an ambient component 152 and a participant component 154. The ambient component 152 of the input 150 contains the low-volume sounds, while the participant component 154 of the input 150 contains the high-volume sounds.

The separation of the low-volume sounds from the high-volume sounds may be achieved using an algorithm canceling the high-volume sounds. However, in this case, depending on the configuration settings in the online meeting manager 162, the low-volume sounds may or may not be suppressed. It will be assumed in this example operation that the low-volume sounds, i.e., the ambient sounds 192(1) and 192(2), are not suppressed so that they may be provided to the headphones 170.

It should be understood that it is entirely possible—and in some cases, desirable—for the high-volume sounds, i.e., the participant's voice 190, to be provided back to the meeting participant 180. However, it will be assumed in this example that the high-volume sounds are not provided to the headphones 170.

As the processor 114 renders the low-volume sounds, the processor 114 also receives online meeting input 160 from the online meeting server 120 over the communications medium 130. The online meeting input 160 contains meeting audio 140 from other meeting participants. Conventionally, the processor 114 is configured to provide this meeting audio 140 to the headphones 170.

However, the meeting sound mixer 166 causes the processor 114 to combine the sounds contained in the online meeting input 160 and the ambient component 152 of the microphone input 150 to form speaker output 168. The processor 114 combines these sounds in such a way that, when the speaker output 168 is provided to the headphones 170, the meeting participant 180 is able to distinguish between the meeting audio 140 and the low-volume sounds. In this way, the meeting participant 180 may respond to his or her environment without removing the headphones 170 and interrupting the online meeting.

When the mute setting is enabled, the processor 114 does not transmit the participant component 154 to the online meeting server 120. However, it should be understood that, even though the mute setting is enabled, the processor still receives microphone input 150 in the case that the ambient sounds 192(1) and 192(2) are to be provided to the headphones 170.

The ambient sound filtering engine 164 can enable the meeting participant not only to distinguish the low-volume sounds, i.e., the ambient sounds 192(1) and 192(2), from the meeting audio 140, but also to realize approximate locations of the respective sources 182(1) and 182(2) of the ambient sounds 192(1) and 192(2).

Figure 2:
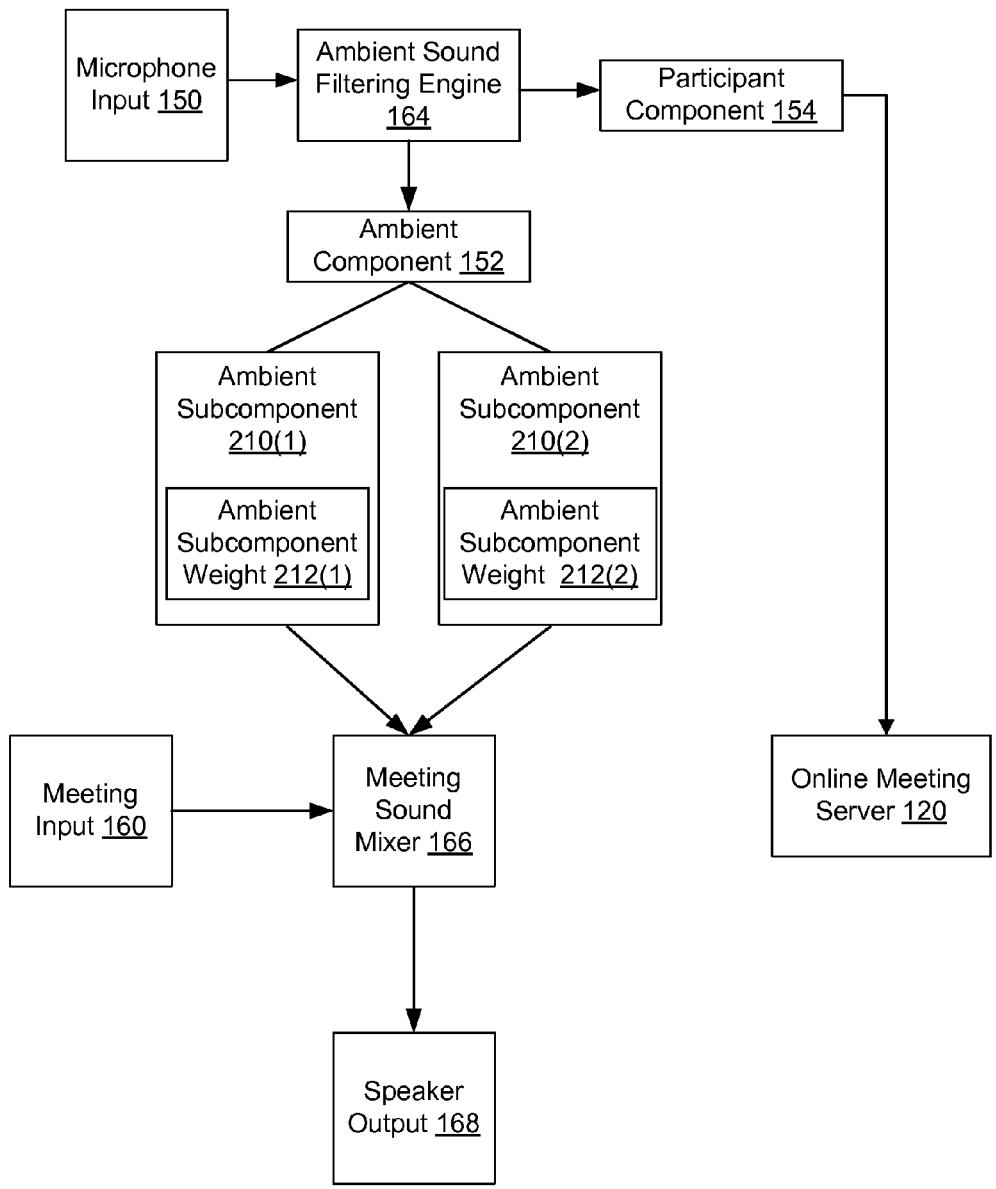
FIG. 2 is a block diagram illustrating an example implementation of an ambient sound rendering engine within the electronic environment illustrated in FIG. 1.

FIG. 2 illustrates an example implementation of the ambient sound rendering engine that takes in localization and/or diffusivity information and simulate such information in the headphones 170. As illustrated in FIG. 2, the microphone input 150 appears as an input into the ambient sound filtering engine 164. In actuality, the ambient sound rendering engine causes the processor 114 (FIG. 1) to operate on the microphone input 150 so as to render the ambient sound contained within.

As discussed above, the ambient sound filtering engine 164 causes the processor 114 to decompose the microphone input into an ambient component 152 and a participant component 154. The processor 114 may then transmit only the participant component 154 to the online meeting server 120 when the mute setting is disabled.

In some cases, the meeting participant 180 may want a realistic rendering of the ambient sounds 192(1) and 192(2). For example, while the meeting participant 180 may be able to hear the colleague's voice 192(1), he or she may not be able to tell where the colleague 182(1) is positioned. To provide this realism, the rendering process described above should determine diffusivity and localization information. To simulate such realism, a typical approach involves broadcasting the ambient sounds on multiple speakers.

However, since in a typical configuration the only speaker is headphones 170, such realism may be instead simulated by weighting different ambient sounds differently. Such weighting may simulate relative volumes (e.g., a louder sound may be closer to the meeting participant 180). Further, in some cases, the weighting may include phase information that provides further localization information.

During an example operation, the ambient sound filtering engine 164 causes the processor 114 to resolve the ambient component 152 of the microphone input 150 into ambient subcomponents 210(1) and 210(2). Ambient subcomponent 210(1) contains relatively high-volume sound representing mostly ambient sound 192(1) and ambient subcomponent 210(2) contains relatively low-volume sound representing mostly ambient sound 192(2).

Once the ambient subcomponents have been resolved, the processor 114 generates weights 212(1) and 212(2) corresponding to respective ambient subcomponents 210(1) and 210(2). As discussed above, the processor 114 generates each weight 212 based on a volume of the sound contained in the subcomponent 210 to which that weight 212 corresponds. For example, each weight 212 may be a number between 0 and 1, or 0 and 100. Alternatively, each weight 212 may be a complex number that includes phase and volume information.

FIG. 2 illustrates each ambient subcomponent 210, as well as meeting input 160, being input into the meeting sound mixer 166 to form the speaker output 168. Actually, meeting sound mixer 166 causes the processor 114 to perform a weighted addition of the online meeting input 160 and each of the set of ambient sound subcomponents 210 based on the generated weights. In some arrangements, the processor 114 also generates a weight corresponding to the meeting input 160 that also represents a volume level of the meeting audio 140. Such volume levels may be set by the meeting participant 180 in the GUI window.

Up until now, the provision of the speaker output 168 to the headphones 170 has not been considered in detail. However, it should be understood that, even when the headphones are configured to reproduce sound monophonically, there are ways to provide the speaker output 168 to the headphones that enhances the realism of the ambient sound rendering.

However, in some arrangements, the processor 114 does not resolve the ambient component 152 into such subcomponents. Rather, the sound contained in ambient subcomponent is delivered as part of the speaker output 168 directly.

Figure 3:
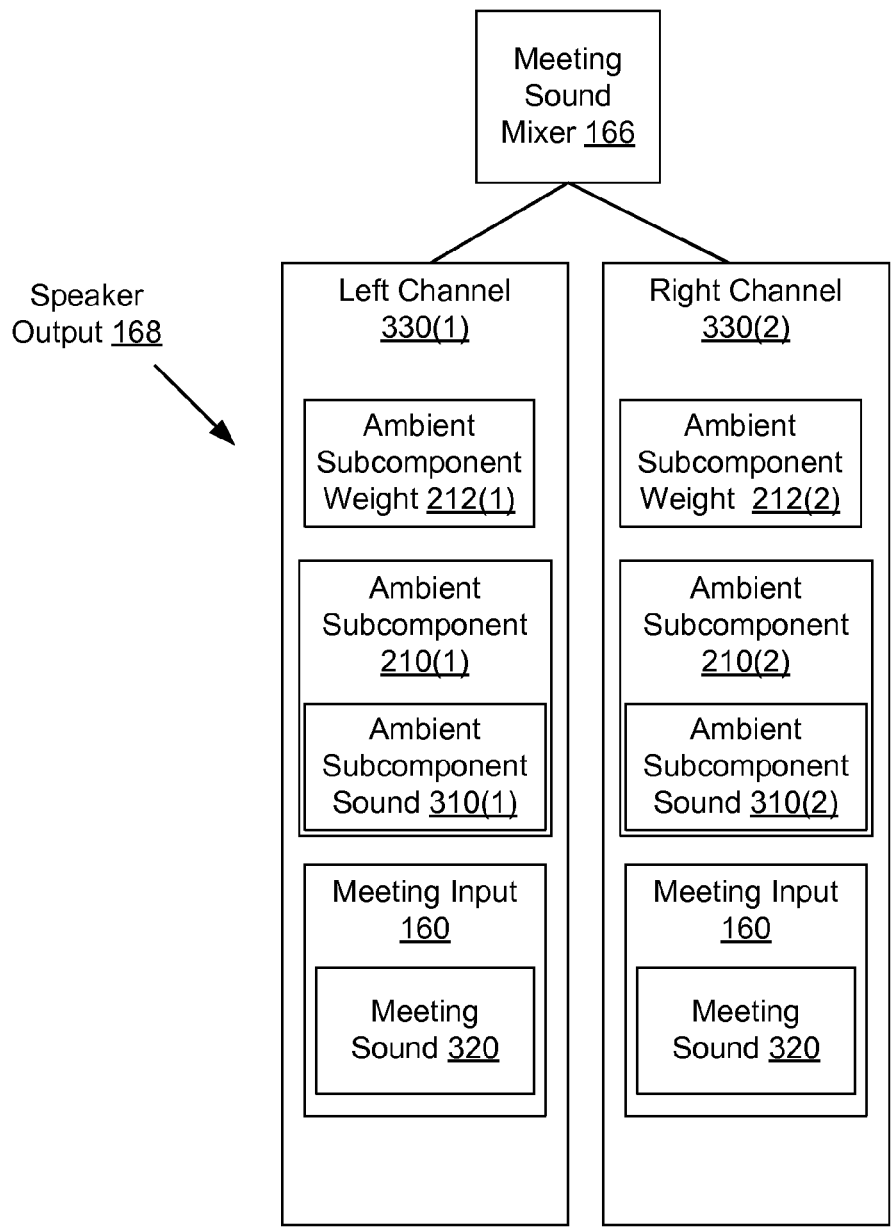
FIG. 3 is a block diagram illustrating an example implementation of a meeting sound mixer within the electronic environment illustrated in FIG. 1.

FIG. 3 illustrates an example implementation of the meeting sound mixer 166 so that the realism of the ambient sound rendering is enhanced. Here, the speaker output 168 is presented as having a left channel 330(1) and a right channel 330(2), which provide sound to the left ear and right ear, respectively. It will be assumed for this example implementation that the headphones 170 are configured to reproduce sound monophonically.

Because the headphones 170 are monophonic, the content provided to the left channel 330(1) and the right channel 330(2) must be the same. However, the meeting sound mixer 166 may cause the processor 114 to generate a respective left channel weight 320(1) and a right channel weight 320(2). These weights may induce an imbalance in the volume level in each channel 330 so that the meeting participant 180 may be able to further distinguish meeting sound 320 from ambient sounds 192, and each ambient sound 192(1) and 192(2) from each other.

Figure 4:
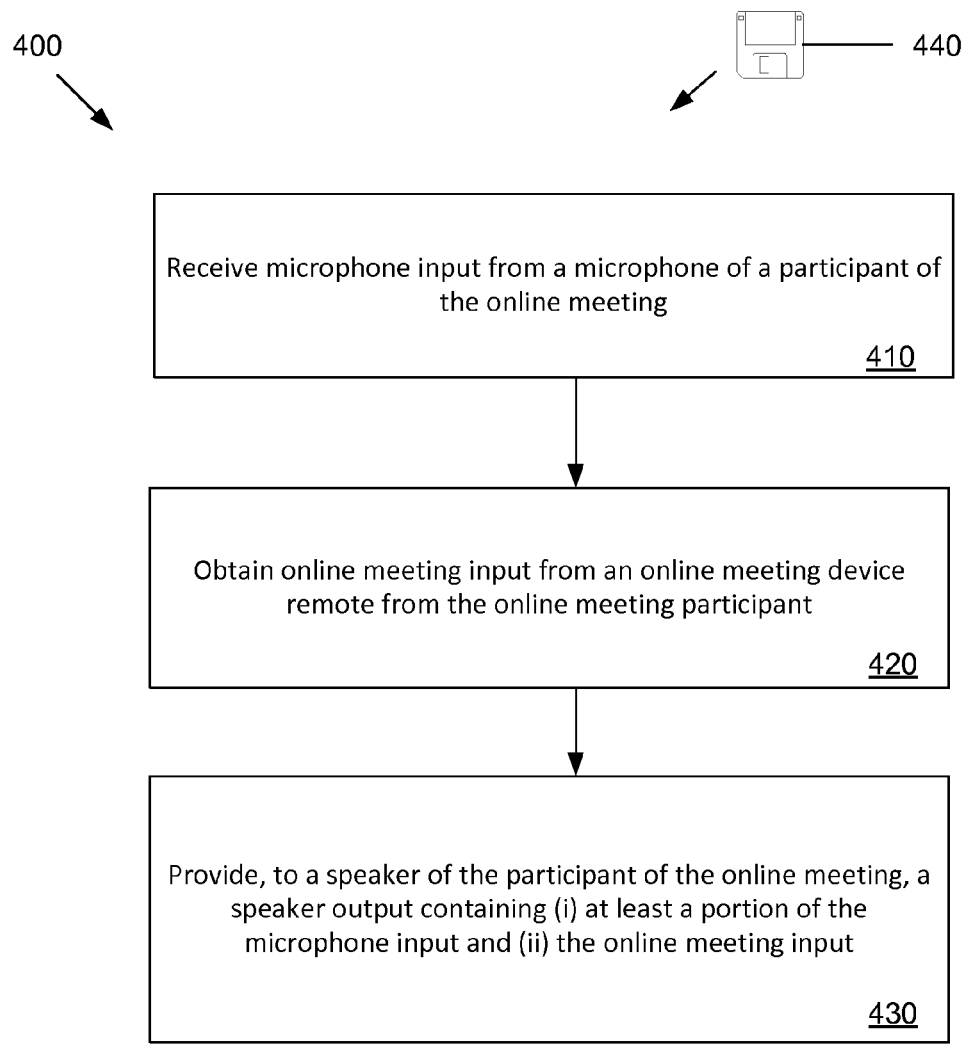
FIG. 4 is a flow chart illustrating an example method of carrying out the improved technique within the electronic environment illustrated in FIG. 1.

FIG. 4 illustrates a method 400 of conducting an online meeting. The method 400 may be performed by the software constructs described in connection with FIG. 1, which reside in the memory 116 of the local computer 110 and are run by the processor 114.

At 410, microphone input is received from a microphone of a participant of the online meeting. The microphone input typically contains participant audio (e.g., the participant's voice 190) and ambient sound (e.g., ambient sound 192(1) and 192(2)).

At 420, online meeting input is obtained from an inline meeting device remote from the online meeting participant. The online meeting input contains audio from other participants of the online meeting, who are typically located remote form the meeting participant 180.

At 430, a speaker output is provided to a speaker of the participant of the online meeting. The speaker output contains (i) at least a portion of the microphone input and (ii) the online meeting input. Typically, the portion of the microphone input contained in the speaker output includes the ambient sound but not the participant's voice.

Improved techniques of conducting an online meeting involve outputting ambient sound to a participant of an online meeting. Advantageously, the improved techniques enable an online meeting participant to react to ambient sounds—when encapsulated in low-volume sounds that are filtered out by the computer—without interrupting the meeting.

It should be understood that the improved techniques described herein are directed to the improvement of a technological process, namely the conducting of an online meeting by meeting participants. By mixing low-volume sounds with meeting audio, a computer operating according to the improved techniques enables meeting participants to be aware of their physical environments while fully attending an online meeting.

Having described certain embodiments, numerous alternate embodiments or variations can be made. For example, the headphones 170 may be stereophonic rather than monophonic. In that case, the left and right channels 330 (FIG. 3) may contain different ambient subcomponents in order to further assist the meeting participant to locate the source of the ambient sounds.

Further, although only two ambient sources 182(1) and 182(2) were discussed in the above examples, it should be understood that any number of ambient sources may be used in this improved technique.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 440 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of conducting an online meeting, the method comprising:
   receiving microphone input from a microphone of a participant of the online meeting;
   obtaining online meeting input from an online meeting device remote from the online meeting participant; and
   providing, to a speaker of the participant of the online meeting, a speaker output containing (i) at least a portion of the microphone input and (ii) the online meeting input;
   wherein the microphone input contains high-volume sound and low-volume sound;
   wherein the method further comprises:
   separating the microphone input into a participant voice component and an ambient sound component, the participant voice component containing the high-volume sound, the ambient sound component containing the low-volume sound;
   rendering the low-volume sound contained in the ambient sound component to produce a rendered ambient sound component;
   prior to providing the speaker output to the participant of the online meeting, combining the rendered ambient sound component and the online meeting input to produce the speaker output;
   providing, over a first channel, the participant voice component to the other participants of the online meeting;
   providing, over a second channel, the ambient sound component to a mixing component in which the ambient sound component and the online meeting input are combined; and
   performing, over the second channel, a filtering operation on the participant voice component, the filtering operation suppressing the high-volume sound contained in the participant voice component;
   wherein rendering the sound contained in the ambient sound component includes:
   resolving the ambient sound component into a set of ambient sound subcomponents, each of the set of ambient sound subcomponents containing sounds in different volume ranges; and
   for each of the set of ambient sound subcomponents, generating a weight corresponding to that ambient sound subcomponent based on a volume of the sound contained in that ambient sound subcomponent;
   wherein combining the ambient sound component and the online meeting input includes performing a weighted addition of the online meeting input and each of the set of ambient sound subcomponents based on the generated weights;
   wherein the speaker output is provided to the speaker over a left audio channel and a right audio channel; and
   wherein, for each of the set of ambient sound subcomponents, generating the weight corresponding to that ambient sound subcomponent includes producing a left weight and a right weight corresponding to that ambient sound subcomponent, a volume of the sound contained in that ambient sound subcomponent being provided to the speaker over the left audio channel according to left weight corresponding to that ambient sound subcomponent, a volume of the sound contained in that ambient sound subcomponent being provided to the speaker over the right audio channel according to the right weight corresponding to that ambient sound subcomponent.

2. A method as in claim 1, further comprising:
   receiving a mute indicator indicating that the high-volume sound contained in the participant voice component is not to be heard by the other participants of the online meeting; and
   performing, over the first channel, a second filtering operation on the participant voice component to suppress the sound contained in the participant voice component.

3. A method as in claim 1, further comprising:
   receiving an ambient mute indicator indicating that the low-volume sound is not to be heard by the participant; and
   in response to receiving the ambient mute indicator, providing, to the speaker of the participant of the online meeting, a speaker output containing (i) the online meeting input and (ii) none of the microphone input.

4. A computer program product including a non-transitory, computer-readable storage medium which stores executable code, which when executed by a computer, causes the computer to perform a method of conducting an online meeting, the method comprising:
   receiving microphone input from a microphone of a participant of the online meeting;
   obtaining online meeting input from an online meeting device remote from the online meeting participant; and
   providing, to a speaker of the participant of the online meeting, a speaker output containing (i) at least a portion of the microphone input and (ii) the online meeting input;
wherein the microphone input contains sound generated by the participant of the online meeting and sound generated in the vicinity of the participant of the online meeting;
wherein the method further comprises:
   separating the microphone input into a participant voice component and an ambient sound component, the participant voice component containing the high-volume sound, the ambient sound component containing the low-volume sound;
   rendering the low-volume sound contained in the ambient sound component to produce a rendered ambient sound component;
   prior to providing the speaker output to the participant of the online meeting, combining the rendered ambient sound component and the online meeting input to produce the speaker output;
   providing, over a first channel, the participant voice component to the other participants of the online meeting;
   providing, over a second channel, the ambient sound component to a mixing component in which the ambient sound component and the online meeting input are combined; and
   performing, over the second channel, a filtering operation on the participant voice component, the filtering operation suppressing the high-volume sound contained in the participant voice component;
wherein the speaker output is provided to the speaker over a left audio channel and a right audio channel;
wherein rendering the sound contained in the ambient sound component includes:
   resolving the ambient sound component into a set of ambient sound subcomponents, each of the set of ambient sound subcomponents containing sounds in different volume ranges; and
   for each of the set of ambient sound subcomponents, generating a weight corresponding to that ambient sound subcomponent based on a volume of the sound contained in that ambient sound subcomponent; and
wherein, for each of the set of ambient sound subcomponents, generating the weight corresponding to that ambient sound subcomponent includes producing a left weight and a right weight corresponding to that ambient sound subcomponent, a volume of the sound contained in that ambient sound subcomponent being provided to the speaker over the left audio channel according to left weight corresponding to that ambient sound subcomponent, a volume of the sound contained in that ambient sound subcomponent being provided to the speaker over the right audio channel according to the right weight corresponding to that ambient sound subcomponent.

5. A computer program product as in claim 4, wherein the method further comprises:
   receiving a mute indicator indicating that the high-volume sound contained in the participant voice component is not to be heard by the other participants of the online meeting; and
   performing, over the first channel, a second filtering operation on the participant voice component to suppress the sound contained in the participant voice component.

6. A computer program product as in claim 5, wherein rendering the sound contained in the ambient sound component further includes:
   wherein combining the ambient sound component and the online meeting input includes performing a weighted addition of the online meeting input and each of the set of ambient sound subcomponents based on the generated weights.

7. A computer program product as in claim 4, wherein the method further comprises:
   receiving an ambient mute indicator indicating that the low-volume sound is not to be heard by the participant; and
   in response to receiving the ambient mute indicator, providing, to the speaker of the participant of the online meeting, a speaker output containing (i) the online meeting input and (ii) none of the microphone input.

8. An electronic apparatus constructed and arranged to conduct an online meeting, the apparatus comprising:
   a network interface;
   memory; and
   controlling circuitry coupled to the memory, the controlling circuitry being constructed and arranged to:
      receive microphone input from a microphone of a participant of the online meeting;
      obtain online meeting input from an online meeting device remote from the online meeting participant; and
      provide, to a speaker of the participant of the online meeting, a speaker output containing (i) at least a portion of the microphone input and (ii) the online meeting input;
wherein the microphone input contains sound generated by the participant of the online meeting and sound generated in the vicinity of the participant of the online meeting;
wherein the controlling circuitry is further constructed and arranged to:
   separate the microphone input into a participant voice component and an ambient sound component, the participant voice component containing the high-volume sound, the ambient sound component containing the low-volume sound;
   render the sound contained in the ambient sound component to produce a rendered ambient sound component;
   prior to providing the speaker output to the participant of the online meeting, combining the rendered ambient sound component and the online meeting input to produce the speaker output;
   provide, over a first channel, the participant voice component to the other participants of the online meeting;
   provide, over a second channel, the ambient sound component to a mixing component in which the ambient sound component and the online meeting input are combined; and
   perform, over the second channel, a filtering operation on the participant voice component, the filtering operation suppressing the high-volume sound contained in the participant voice component;

wherein the controlling circuitry, when rendering the sound contained in the ambient sound component is constructed and arranged to:
  resolve the ambient sound component into a set of ambient sound subcomponents, each of the set of ambient sound subcomponents containing sounds in different volume ranges; and
  for each of the set of ambient sound subcomponents, generate a weight corresponding to that ambient sound subcomponent based on a volume of the sound contained in that ambient sound subcomponent;
wherein the controlling circuitry, when combining the ambient sound component and the online meeting input, is further and arranged to:
  generate a weight corresponding to the online meeting input based on a volume of a sound contained in the online meeting input relative to the sound contained in each of the set of ambient sound subcomponents; and
  perform a weighted addition of the online meeting input and each of the set of ambient sound subcomponents based on the generated weights;
wherein the speaker output is provided to the speaker over a left audio channel and a right audio channel; and
wherein the controlling circuitry, when generating the weight corresponding to that ambient sound subcomponent for each of the set of ambient sound subcomponents, is constructed and arranged to produce a left weight and a right weight corresponding to that ambient sound subcomponent, a volume of the sound contained in that ambient sound subcomponent being provided to the speaker over the left audio channel according to left weight corresponding to that ambient sound subcomponent, a volume of the sound contained in that ambient sound subcomponent being provided to the speaker over the right audio channel according to the right weight corresponding to that ambient sound subcomponent.

9. An apparatus as in claim 8, wherein the controlling circuitry is further constructed and arranged to:
  receive a mute indicator indicating that the high-volume sound contained in the participant voice component is not to be heard by the other participants of the online meeting; and
  perform, over the first channel, a second filtering operation on the participant voice component to suppress the sound contained in the participant voice component.

10. A method of providing audio output to a user, the method comprising:
  receiving, by processing circuitry, a microphone signal from a microphone of the user, the microphone signal containing voice input from the user and ambient noise in a vicinity of the user;
  obtaining, by the processing circuitry, an audio signal containing audio from an external source; and
  in response to the microphone signal and the audio signal, outputting, by the processing circuitry, a speaker signal to a speaker of the user, the speaker signal containing the ambient noise and the audio from the external source;
wherein the voice input is omitted from the speaker signal even though the ambient noise in the vicinity of the user is present within the speaker signal; and
wherein outputting the speaker signal to the speaker includes:
  performing a filtering operation which takes the microphone signal as an input and produces the ambient noise as an output;
  performing a mixing operation which receives the output of the filtering operation and the external audio signal and produces a combination of the ambient noise and the external audio signal as a resultant signal; and
  providing, as the speaker signal, the resultant signal of the mixing operation.

11. A method as in claim 10 wherein the method further includes:
  performing an additional filtering operation which takes the microphone signal as an input and produces the voice input as a resultant signal; and
  outputting, by the processing circuitry, the resultant signal of the additional filtering operation to external receiving equipment remote from the user.

12. A method as in claim 11, wherein producing the combination of the ambient noise and the external audio signal as the resultant signal includes:
  decomposing the result of the filtering operation into a set of ambient noise components, each ambient noise component of the set of ambient noise components containing sounds in a volume range different from a respective volume range of each other ambient noise signal;
  generating a weight for each ambient noise component; and
  providing, as the combination of the ambient noise and the external audio signal, a combination of the external audio signal with the ambient noise components weighted according to the generated weight for each ambient noise component.

* * * * *